Patented Oct. 26, 1943

2,332,901

UNITED STATES PATENT OFFICE 2,332,901

SYNTHETIC COMPOSITION COMPRISING HYDROLYZED, ACETALIZED, AND/OR KETALIZED COPOLYMERS OF VINYL ESTERS AND UNSATURATED KETONES

Gaetano F. D'Alelio, Pittsfield, Mass., assignor to General Electric Company, a corporation of New York No Drawing. Original application June 7, 1940, Serial No. 339,303. Divided and this application January 22, 1943, Serial No. 473,224

3 Claims. (Cl. 260—63)

The present application is a division of my co-pending application Serial No. 339,303, filed June 7, 1940, and assigned to the same assignee as the present invention.

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, ketalized, or acetalized and ketalized copolymer (or copolymers) of a plurality of copolymerizable materials, one of which is a vinyl ester having at least one

grouping and another of which is a ketone containing at least one

grouping.

It has been suggested heretofore that synthetic compositions may be prepared by partially hydrolyzing (saponifying) a mixed polymerization product of two different vinyl esters (or a vinyl ester and an ester of acrylic acid), each of said esters having a single

grouping and no other polymerizable grouping, and reacting the partially hydrolyzed product with an aldehyde or a ketone to introduce acetal or ketal groups into the product. In such acetalized or ketalized products only the acid portion of one of the esters is removed in part. As a result, such treated copolymers are potentially hydrolyzable. Hydrolysis of the acetalized or ketalized interpolymer during service use of the material would be harmful in many cases, for example where the product is in contact with metals, as the acid liberated by the hydrolysis would pit and corrode the metal surfaces. This danger of acid formation is even greater if an acrylic ester constitutes a component of the copolymer reactant.

Taking vinyl oleate and vinyl acetate as illustrative of the compounds previously suggested as suitable for forming a copolymer that subsequently might be acetalized, the following structural formulas illustrate the various steps in the production of the acetal derivative:

Copolymer reactant before hydrolysis

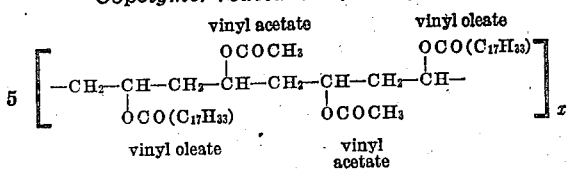

After hydrolysis of the acetate groups

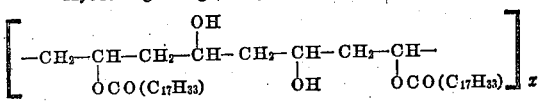

After formalization

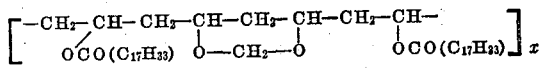

The oleic acid groups remaining in the molecule are potentially hydrolyzable, as a result of which the acetalized products have the disadvantages mentioned above. In the case of copolymer reactants made from vinyl acetate and an acrylic ester, e. g., methyl acrylate, the vinyl ester portion of the copolymer cannot be hydrolyzed without at least some hydrolysis of the acrylic ester portion of the copolymer. When such hydrolyzed copolymers are acetalized, ketalized, or acetalized and ketalized, free acid groups are present in the reaction product as made, since the acrylic acid part of the hydrolyzed copolymer cannot be acetalized, ketalized, or acetalized and ketalized. The following structural formulas illustrate the steps in the formation of an acetalized derivative of a copolymer of vinyl acetate and methyl acrylate:

Copolymer reactant before hydrolysis

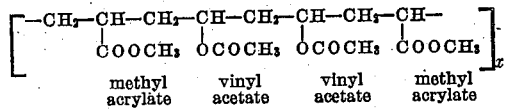

After hydrolysis

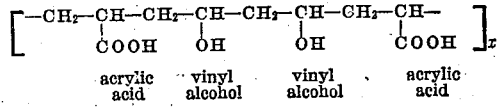

After formalization

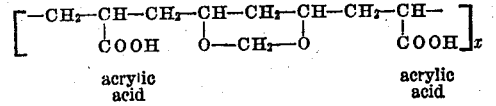

I have discovered that synthetic compositions which are different from, and in many respects superior to, organic artificial masses heretofore known can be produced by acetalizing, ketalizing, or acetalizing and ketalizing a hydrolyzed copolymer of a plurality of copolymerizable materials, one of which is a vinyl ester having at least one

grouping (e. g., vinyl formate, vinyl acetate, etc.) and another of which is a ketone containing a

grouping and at least one other polymerizable grouping. Examples of such ketones are divinyl ketone, vinyl propenyl ketone, diallyl acetone, etc. The products of my invention are especially adapted for use in applications requiring a permanently high dielectric strength and a permanent noncorrosive action when in contact with metals.

When a vinyl ester having at least one

grouping is copolymerized with a ketone containing a

group and at least one other polymerizable grouping, cross-linkage takes place. Cross-linking also occurs when a vinyl ester containing a

grouping and at least one other polymerizable grouping is copolymerized with a ketone having a single

grouping and no other polymerizable grouping. By using such cross-linked copolymers as starting reactants, the properties of the final product are further beneficially affected. This is due to the fact that the cross-linked copolymer imparts to the finished product the high impact strength and other desirable properties which characterize the starting copolymer reactant. It was quite surprising and unexpected to find that such cross-linked copolymers could be acetalized, ketalized, or acetalized and ketalized, particularly in view of the fact that these materials are infusible and substantially insoluble in all the ordinary solvents. I have also found that the cross-linked copolymers thereby obtained are sufficiently thermoplastic that, unlike the starting copolymer, they can be molded under heat and pressure to a desired shape. That cross-linked copolymers of vinyl esters and unsaturated ketones which have been acetalized, ketalized, or acetalized and ketalized would have this property, which may be described as "semi-thermoplasticity," was unexpected and unpredictable, since it is inconceivable that the cross-linkage present in the starting copolymer would be destroyed during the reaction with a

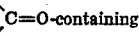

compound.

In carrying my invention into effect I hydrolyze a copolymer of a vinyl ester having at least one

grouping and a material copolymerizable therewith comprising a ketone containing a

grouping and at least one other polymerizable grouping. I then cause the hydrolyzed copolymer to react with a

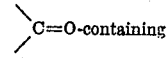

organic compound selected from the class consisting of aldehydes, ketones and mixtures of aldehydes and ketones until at least some of the hydroxyl groups of the hydrolyzed copolymer have been replaced by the corresponding acetal, ketal or acetal and ketal groups. For example, I may hydrolyze the copolymer to at least 10 per cent, more particularly from 25 to 100 per cent, of that theoretically possible and acetalize, ketalize, or acetalize and ketalize the hydrolyzed copolymer until at least 10 per cent of the hydroxyl groups of the hydrolyzed copolymer have been replaced by acetal, ketal, or acetal and ketal groups. In some cases, for instance where the resistance of the product to water is of secondary consideration, the hydrolyzed copolymer may have only a minor proportion (that is, less than 50 per cent) of its hydroxyl groups replaced by acetal, ketal, or acetal and ketal groups. For most applications, however, it is usually desirable that at least 50 per cent, say 60 to 100 per cent, of the hydroxyl groups of the hydrolyzed copolymer be replaced by acetal, ketal, or acetal and ketal groups. Particularly valuable products are obtained when the copolymer is hydrolyzed to from 50 to 100 per cent of that theoretically possible and the hydrolyzed copolymer is acetalized, ketalized, or acetalized and ketalized until from 75 to 100 per cent of the hydroxyl groups of the hydrolyzed copolymer have been replaced by acetal, ketal, or acetal and ketal groups.

In order that those skilled in the art better may understand how to practice this invention, the following more detailed description is given:

*Preparation of copolymer*

In effecting copolymerization between the vinyl ester and the unsaturated ketone the components are mixed and interpolymerized in the presence or absence of a polymerization catalyst. Preferably a polymerization catalyst is used. Examples of such catalysts are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., mixed peroxides, e. g., acetyl benzoyl peroxide, acetyl stearyl peroxide, etc., various per-compounds such as perborates, persulfates, perchlorates, etc., aluminum salts such as the halides, e. g., aluminum chloride, etc., organic and inorganic acids such as methacrylic, hydrofluoric, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the components is of secondary consideration, copolymerization may be effected merely under the influence of heat, light, or heat and light and in the absence of a polymerization catalyst.

The rate of copolymerization and the properties of the starting copolymer reactant vary with the time, concentration and, if a catalyst is used, also with the catalyst concentration, as well as upon the particular monomers or partial polymers employed in preparing the copolymer and the proportions thereof. Copolymerization may be effected at from room temperature (20° to 30° C.) to temperatures above 100° C., for example about 130° C., but ordinarily I use temperatures within the range of 60° to 120° C. in causing the mixed components to interpolymerize.

Mainly for economic reasons I prefer to use not more than 50 per cent by weight (of the mixture) of the unsaturated ketone in forming the copolymer reactant, and generally use less than 30 per cent, for example from 0.1 to 10 per cent. The particular proportions employed are dependent to a large extent upon the particular starting components and the particular properties desired in the finished product.

In certain cases, instead of copolymerizing a single vinyl ester with one or more unsaturated ketones, I may copolymerize a plurality of such esters with a single or with a plurality of unsaturated ketones. Also, in some cases, other organic materials which are copolymerizable with the vinyl ester (or esters) and the unsaturated ketone (or ketones) may be incorporated into the mixture and the whole copolymerized to form a copolymer reactant of improved utility in the production of an acetalized, ketalized, or acetalized and ketalized copolymer of particular properties. Examples of such organic materials which may be used with the vinyl ester and the unsaturated ketone in forming the copolymer reactant are maleate esters, fumerate esters, acrylonitriles, acryloaldehydes, unsaturated ethers having at least one

grouping, etc.

Illustrative examples of vinyl esters, in addition to those previously mentioned, which may be employed in preparing the starting copolymer reactant, are the vinyl esters of saturated and unsaturated, aliphatic and aromatic, monobasic and polybasic acids, more specifically the vinyl esters of the following acids: chloroacetic, propionic, bromopropionic, butyric, isobutyric, valeric, caprioc, heptylic, nonylic, capric, acrylic, alkacrylic (e. g., methacrylic, ethacrylic, etc.), crotonic, oxalic, malonic, succinic, glutaric, adipic, pimelic, suberic, azelaic, sebacic, benzoic, toluic, phenyl acetic, phthalic, terephthalic, benzoyl phthalic, benzophenone-2,4' dicarboxylic, cinnamic, tricarballylic, tartaric, citric, lactic, etc., including the alpha unsaturated alpha beta polycarboxylic acids, e. g., maleic, monohalomaleic, fumaric, monohalofumaric, citraconic, mesaconic, acetylene dicarboxylic, aconitic, itaconic, etc. Additional examples of vinyl esters which may be used in preparing the copolymer reactant are vinyl hexahydrobenzoate, vinyl propyl succinate, vinyl butyl phthalate, vinyl diethyl citrate, trivinyl citrate, vinyl phenyl acetate, divinyl o-phenylene diacetate, divinyl phenyl butyrate o-carboxylate, trivinyl trimesate, vinyl-o-tuluylate, etc. The structural formulas of these last-named vinyl esters are given in my copending application Serial No. 336,981, filed May 24, 1940, and assigned to the same assignee as the present invention.

In some cases it is of particular advantage to use vinyl esters containing a

grouping and at least one other polymerizable grouping, e. g., another

grouping. Numerous examples of such vinyl esters have been given above. Thermoplastic copolymers may be obtained, for example, by copolymerizing a vinyl ester containing a single

grouping with an unsaturated ketone also containing a single

grouping. By controlling the extent of hydrolysis and acetalization, ketalization, or acetalization and ketalization of such thermoplastic copolymers, products varying from soft thermoplastic (heat-softening) to hard, semi-thermoplastic solids may be obtained. By copolymerizing a vinyl ester containing a single or a plurality of

groupings with an unsaturated ketone containing a

grouping and at least one another polymerizable grouping, non-thermoplastic copolymers result. When such copolymers are acetalized, ketalized, or acetalized and ketalized, semi-thermoplastic products capable of being shaped under heat and pressure are produced.

*Treatment of copolymer*

The starting copolymer reactant may be partially or completely hydrolyzed and thereafter acetalized, ketalized, or acetalized and ketalized or, the partial or complete acetalization, ketalization, or acetalization and ketalization of the copolymer may be caused to take place simultaneously with the partial or complete hydrolysis of the copolymer.

When the copolymer is hydrolyzed separately from the acetalization, ketalization, or acetalization and ketalization reaction, this may be done, for example, by heating the copolymer with water and a suitable catalyst, examples of which are strong alkalies (e. g., sodium and potassium hydroxides, tetra-alkyl ammonium hydroxides, etc.) and acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially re-esterified if the hydrolysis has been carried farther than desired), then is acetalized, ketalized, or acetalized and ketalized by causing it to react under acid conditions with an aldehyde, a ketone, a mixture of different aldehydes, a mixture of different ketones, or a mixture of a single aldehyde and a single ketone or a plurality of different aldehydes and different ketones. The reaction is continued until the desired percentage of hydroxyl groups in the hydrolyzed copolymer have been replaced by acetal, ketal, or acetal and ketal groups. The solid reaction product then is isolated from the reaction mass, washed and dried.

Preferably I conduct the reaction with the

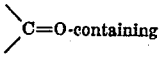

compound under acid conditions, simultaneously with the hydrolysis of the copolymer. This may be done, for example, by treating the copolymer with water, an acidic catalyst (examples of which were given in the preceding paragraph) and an organic compound containing or engendering an active carbonyl

grouping, e. g., aldehydes, ketones, etc. Preferably the reaction is carried out in the presence of a liquid medium adapted to cause a molecular dispersion of the reaction product, e. g., in acetic acid, propionic acid, liquid (or liquefiable) monohydric alcohols, e. g., ethyl alcohol, butyl alcohol, amyl alcohol, etc., mixtures of liquid alcohols, acids and esters, etc. To shorten the time required to acetalize, ketalize, or acetalize and ketalize the copolymer, it is desirable to maintain the reactants at an elevated temperature, say 60° to 100° C. or above, the exact temperature depending more or less upon the boiling point of the mixture. Ordinarily the reaction is carried out under reflux at or approaching the boiling point of the reaction mass.

After the conjoint hydrolysis and reaction with the

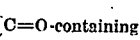

compound has been carried to the desired stage as determined by analysis or by previous experience, the reaction mass usually is mixed with water to which may be added, if desired, a neutralizing agent (e. g., sodium and potassium hydroxides and carbonates, ammonium hydroxide, etc.) for the acidic bodies. This causes coagulation of the treated copolymer, which thereafter is washed until free of water-soluble materials and then dried. The resulting products can be shaped by the application of heat, pressure or heat and pressure.

As agents for treating the copolymer I may use any aldehyde or ketone or any compound engendering an aldehyde or a ketone, that is, a compound which will be converted to an aldehyde or a ketone during the reaction. Examples of such compounds are formaldehyde, paraformaldehyde, paraldehyde, trioxymethylene, acetaldehyde, propionaldehyde, butyraldehyde, acrolein, methacrolein, crotonaldehyde, benzaldehyde, cinnamic aldehyde, anisaldehyde, p-methoxy phenyl acetaldehyde, furfural, acetone, chloroacetone, methvinyl ketone, divinyl ketone, methyl ethyl ketone, acetophenone, benzophenone, quinone tetrahydroquinone, benzil, benzoyl acetone, acetyl dibenzoyl methane, benzal acetophenone, mesityl oxide, shogaol, cyclohexanone, vanillin, zingerone, alphy-oxytetrahydronaphthalene, paeonol, etc.

The properties, for example hardness, of the acetalized, ketalized, or acetalized and ketalized copolymer are considerably influenced by the particular treating agent used. Thus, for the same copolymer and the same degree of hydrolysis and acetalization, formaldehyde will yield a harder acetalized copolymer than propionaldehyde. On the other hand, acrolein and furfural yield more solvent-resistant copolymers than formaldehyde. Mixtures of different aldehydes or of different ketones or of aldehydes and ketones may be used in certain cases to impart particular properties to the reaction product. In such modifications, the mixed treating agents may be caused to react together upon the hydrolyzed copolymer, the hydrolysis being carried out first and the reaction with the

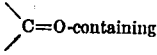

compound afterwards, or hydrolysis and condensation with the mixed treating agents may be carried out simultaneously. Or, the hydrolyzed copolymer may be reacted first with one

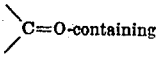

compound and then with another. Or, simultaneous hydrolysis and partial reaction with one

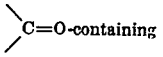

compound may be caused to take place, followed by more complete reaction with a different

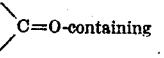

compound.

The properties of the final product depend upon many factors, one of which is the composition of the starting copolymer reactant. The concentration of the polymerization catalyst and the temperature of polymerization used in the production of the copolymer reactant also influence the properties of the final product. High catalyst concentration and/or high polymerization temperature yield copolymers of lower molecular weight than result from lower amounts of catalyst and/or lower polymerization temperatures. These differences are reflected in the reaction products of the copolymer with a

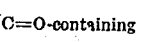

organic compound.

By varying the time and temperature of reaction and the concentration of the catalytic agent and of the

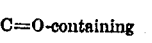

compound, it is possible to vary the extent of hydrolysis and of the reaction of the copolymer with the

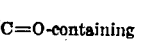

compound. If the hydrolysis is carried out in the absence of a

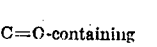

compound, the extent of hydrolysis also may be controlled by carrying hydrolysis farther than is ultimately desired and then re-esterifying the excess hydroxyl groups. In re-esterifying, a different acid than that produced in the hydrolysis may be used thereby further to alter the properties of the final product.

The properties of the final product also may be varied by varying the extent of hydrolysis, the extent of the reaction with the $$\diagdown\!\!\!\diagup C\!=\!O\text{-containing}$$

compound and the ratio of hydroxyl groups to acetal, ketal, or acetal and ketal groups and the ratio of each to the number of ester groups remaining in the molecule. For example, two products with entirely different properties will result from the same copolymer reactant if, in one case, the hydrolysis is carried to 90 per cent of that theoretically possible and then 45 per cent of the available hydroxyl groups are acetalized, ketalized, or acetalized and ketalized, while in the other case the hydrolysis is carried to 45 per cent of that theoretically possible and then 90 per cent of the available hydroxyl groups are acetalized, ketalized, or acetalized and ketalized.

The properties of these new artificial masses may be varied in still other ways. For example, their properties may be varied by carrying out the reaction with the $$\diagdown\!\!\!\diagup C\!=\!O\text{-containing}$$

compound in the presence of other reactants such, for instance, as one or more organic compounds capable of forming a methylol derivative as an intermediate during the resin formation or one or more other compounds capable of reacting with the $$\diagdown\!\!\!\diagup C\!=\!O\text{-containing}$$

compound or with the reaction product of the $$\diagdown\!\!\!\diagup C\!=\!O\text{-containing}$$

compound and the hydrolyzed copolymer. Examples of such modifying reactants which may be used as such, or in the form of their methylol or methylene derivatives, are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, styryl phenol, indene phenol, coumar phenol, resorcinol, chlorophenol, chlorophenyl phenol, chlorostyryl phenol, etc.; hydroxy aromatic esters, e. g., hydroxy benzoates, hydroxy phenyl acetates, hydroxyl phenyl propionates, hydroxy cinnamates, etc.; hydroxy aromatic ethers, e. g., hydroquinone monoethers, guiacols, etc.; monohydric and polyhydric alcohols, e. g., ethyl, propyl, isopropyl, butyl, amyl, etc., alcohols, ethylene glycol, diethylene glycol, glycerine, pentaerythritol, trimethylol nitro methane, etc.; amides, both monoamides and polyamides, e. g., formamide, acetamide, stearamide, malonic diamide, succinic diamide, adipic diamide, phthalic diamide, citric triamide, itaconic diamide, sulfonamides such as toluene sulfonamide, benzamide, urea and its homologues and derivatives and substances of the nature of urea, e. g., thiourea, methyl urea, tertiary amyl urea, phenyl thiourea, guanidine, biguanidine, guanyl urea, triazines, pseudothiourea, melamine, etc.; amines, e. g., ethylene diamine, aniline, phenylene diamine, amino phenols, etc.

The fundamental synthetic compositions of this invention may be varied widely by introducing various modifying bodies during or after reaction of the hydrolyzed copolymer with the $$\diagdown\!\!\!\diagup C\!=\!O\text{-containing}$$

compound. These modifying bodies may take the form of high molecular weight bodies, with or without resinous characteristics, for example, hydrolyzed wood products, lignin, proteins, protein-aldehyde condensation products, furfural condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate hexoate, glycol acetate benzoate, glycol di-acetoacetate, etc.; esters of furfuryl and tetrahydrofurfuryl alcohols, e. g., furfuryl and tetrahydrofurfuryl maleates, itaconates, fumarates, salicylates, phthalates, etc.; the amide esters of alkanol amines, e. g., esters corresponding to the structural formulas $RCONHCR_2CR_2OCOR$, $RCON(CR_2CR_2OCOR)_2$ and $N(CR_2CR_2OCOR)_3$, in which formulas R represents hydrogen, alkyl or aryl radicals; the semi-amides of polyesters, e. g., semi-amides corresponding to the structural formulas

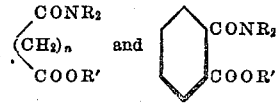

in which formulas $n$ represents 1 or more, R represents hydrogen, alkyl or aryl radicals and R' represents alkyl or aryl radicals; imides, e. g., succinimide, phthalimide, etc.; and similar substances.

The acetylized, ketalized, or acetalized and ketalized interpolymers of this invention may be stabilized against discoloration and made more resistant to decomposition under heat, particularly in the presence of air, by incorporating into the reaction mass or into the intermediate or finished products various inhibiting or stabilizing agents. Examples of such agents which may be used are phenolic bodies, e. g., phenol, resorcinol, catechol, hydroquinone, pyrogallol, phloroglucinol, alpha- and beta-naphthol, cresols, xylenols, carvacrol, thymol, para-tertiary butyl phenol, para-tertiary amyl phenol, para-phenyl phenol, etc.; amines, e. g., ethyl, propyl, butyl and amyl amines and higher members of the homologous series, methyl amyl, ethyl hexyl, iso-propyl butyl amines, etc., alkanol amines, e. g., mono-, di- and tri-ethanol amines, etc., polyamines, e. g., ethylene diamine, tri- and tetra-methylene diamines, etc., aromatic primary, secondary and tertiary amines, e. g., phenyl, naphthyl, naphthyl phenyl amines and substitution products of such amines, benzyl amine, ethyl naphthyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amine-aldehyde condensation products, amide-aldehyde condensation products; and similar substances. The chosen stabilizer (inhibitor) depends largely upon the particular acetalized, ketalized, or acetalized and ketalized interpolymer to be stabilized and the particular service application of the finished product. Any suitable amount of stabilizer may be used, but ordinarily only a relatively small proportion, for example from about 0.1 to 3.0 per cent by weight of the treated interpolymer, is employed.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The particular filler depends upon the particular application for which the molded article is to be used. As fillers may be employed, for instance, bleached or unbleached wood flour, alpha cellulose in flock form, sheets or cuttings of paper, cloth, canvas, etc., asbestos in powdered or long or short fiber length including defibrated asbestos, powdered or flaked mica, wood chips, short or long wood fibers, synthetic or natural continuous threaded fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. g., 125° to 225° C., and at suitable pressures, e. g., at about 1000 to 20,000 pounds per square inch, usually between about 2000 and 4000 pounds per square inch in compression molding.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, China-wood oil, perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized, or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation the following examples are cited:

A liquid coating composition comprising an acetalized, a ketalized, or an acetalized and ketalized interpolymer of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated interpolymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the acetalized, ketalized, or acetalized and ketalized interpolymers of this invention. For example, mica flakes may be cemented and bonded together with an acetalized, a ketalized, or an acetalized and ketalized interpolymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a hydrolyzed copolymer of vinyl acetate and an unsaturated ketone, e. g., divinyl ketone. In such plastic materials the hydroxyl groups of the hydrolyzed copolymer are replaced by butal groups.

The modified or unmodified products of this invention have a wide variety of other uses, for instance in making interior finishing and construction materials, for homes, offices, etc., particularly where high-impact-strength and shock-resistance structures are desired. They also may be molded or otherwise suitably shaped to produce buttons, clock cases, radio cabinets, household utensils, decorative novelties, etc. Certain of the synthetic materials of this invention are fiber-forming, that is, they can be drawn into continuous filaments. Such filaments may be made into felted or woven fabrics. The highly acetalized, ketalized, or acetalized and ketalized interpolymers are especially adapted for use as water repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnants for electrical coils and other electrical devices; as insulation for motors, generators and other dynamo-electric machines, e. g., as insulation for the coil windings, as slot insulation, in the form of sleevings over electrical connections, as separators between running and starting coil windings, etc.

What I claim as new and desire to secure by Letters Patent of the United States is:

1. A composition comprising the product of reaction of a

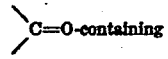

organic compound selected from the class consisting of aldehydes, ketones and mixtures of aldehydes and ketones with a hydrolyzed copolymer of a vinyl ester containing at least one

grouping and a ketone containing a plurality of

groupings.

2. A composition comprising the reaction product of an aldehyde with a hydrolyzed copolymer of vinyl acetate and divinyl ketone.

3. An organic plastic material comprising a plasticized, hydrolyzed copolymer of vinyl acetate and divinyl ketone in which at least 50 per cent of the hydroxyl groups have been replaced by butal groups.

GAETANO F. D'ALELIO.

CERTIFICATE OF CORRECTION.

Patent No. 2,332,901.  October 26, 1943.

GAETANO F. D'ALELIO.

It is hereby certified that error appears in the printed specification of the above-numbered patent requiring correction as follows: Page 3, first column, line 42, for "fumerate" read --fumarate--; line 57, for "caprioc" read --caproic--; page 5, second column, line 56, for "acetylized" read --acetalized--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.